United States Patent
Plokker

(10) Patent No.: US 9,855,596 B2
(45) Date of Patent: Jan. 2, 2018

(54) METHOD FOR PRODUCING A CONNECTOR, CONNECTOR AND AIRCRAFT OR SPACECRAFT

(75) Inventor: Matthijs Plokker, Harsefeld (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 555 days.

(21) Appl. No.: 14/001,047

(22) PCT Filed: Feb. 20, 2012

(86) PCT No.: PCT/EP2012/052838
§ 371 (c)(1),
(2), (4) Date: Oct. 3, 2013

(87) PCT Pub. No.: WO2012/113742
PCT Pub. Date: Aug. 30, 2012

(65) Prior Publication Data
US 2014/0017037 A1 Jan. 16, 2014

Related U.S. Application Data

(60) Provisional application No. 61/446,563, filed on Feb. 25, 2011.

(30) Foreign Application Priority Data

Feb. 25, 2011 (DE) .................. 10 2011 004 775

(51) Int. Cl.
| | |
|---|---|
| *B64F 5/40* | (2017.01) |
| *B32B 7/08* | (2006.01) |
| *B21J 15/02* | (2006.01) |
| *B29C 65/60* | (2006.01) |
| *B29C 65/00* | (2006.01) |
| *B29C 73/10* | (2006.01) |

(Continued)

(52) U.S. Cl.
CPC ............ *B21J 15/02* (2013.01); *B29C 65/601* (2013.01); *B29C 66/1122* (2013.01);
(Continued)

(58) Field of Classification Search
CPC ....... B29C 73/10; B29C 73/04; B64F 5/0081; B64F 5/40; B64F 5/45; B32B 7/08;
(Continued)

(56) References Cited

U.S. PATENT DOCUMENTS 2,692,425 A * 10/1954 Martin ................... B21D 39/03
156/94
3,365,097 A * 1/1968 Chase ..................... B01D 3/32
220/327

(Continued)

FOREIGN PATENT DOCUMENTS

DE        691 15 792       5/1991
DE   10 2009 001 075      9/2010
(Continued)

OTHER PUBLICATIONS

International Search Report, dated Jun. 11, 2012.
"Nondestructive inspection and repair", F.C. Campbell, 2004.
German Office Action, dated Feb. 25, 2011.

*Primary Examiner* — Michael P Ferguson
(74) *Attorney, Agent, or Firm* — Greer, Burns & Crain, Ltd.

(57) ABSTRACT

A method for producing a connector, in particular for repair, in particular in the field of aviation and aerospace, including the steps of: providing a base layer; attaching a first layer of fiber composite material having a first rigidity to the base layer; attaching a second layer of fiber composite material having a second rigidity to the first layer, offset therefrom, the second rigidity being greater than the first rigidity; and riveting the first layer to the base layer and riveting the second layer to the first layer and to the base layer.

8 Claims, 3 Drawing Sheets

(51) Int. Cl.
  *F16B 19/04* (2006.01)
  *B29C 65/50* (2006.01)
  *B29L 31/30* (2006.01)
  *B29C 65/56* (2006.01)

(52) U.S. Cl.
  CPC .......... *B29C 66/472* (2013.01); *B29C 66/721* (2013.01); *B29C 66/7315* (2013.01); *B29C 73/10* (2013.01); *B64F 5/40* (2017.01); *F16B 19/04* (2013.01); *B29C 65/5057* (2013.01); *B29C 65/564* (2013.01); *B29C 66/7212* (2013.01); *B29C 66/742* (2013.01); *B29C 66/9592* (2013.01); *B29L 2031/3082* (2013.01); *B29L 2031/3097* (2013.01); *Y10T 29/49956* (2015.01)

(58) Field of Classification Search
  CPC ....... B32B 7/04; B64C 1/12; B63B 2009/008; F16L 1/26
  See application file for complete search history.

(56) References Cited

U.S. PATENT DOCUMENTS

| | | | | |
|---|---|---|---|---|
| 4,152,877 | A | * | 5/1979 | Green ..................... B29C 73/06 24/326 |
| 4,858,853 | A | * | 8/1989 | Westerman ........... B64F 5/0081 244/119 |
| 5,424,105 | A | | 6/1995 | Stewart |
| 6,899,488 | B2 | * | 5/2005 | Geringer ................ B62D 55/00 296/30 |

FOREIGN PATENT DOCUMENTS

| | | |
|---|---|---|
| DE | 10 2009 014 973 | 9/2010 |
| DE | 10 2009 023 864 | 12/2010 |
| EP | 0471923 | 2/1992 |
| EP | 1 520 895 | 1/2010 |
| FR | 2953812 | 6/2011 |
| WO | 2010122325 | 10/2010 |

* cited by examiner (I-I)
Prior Art (II-II)

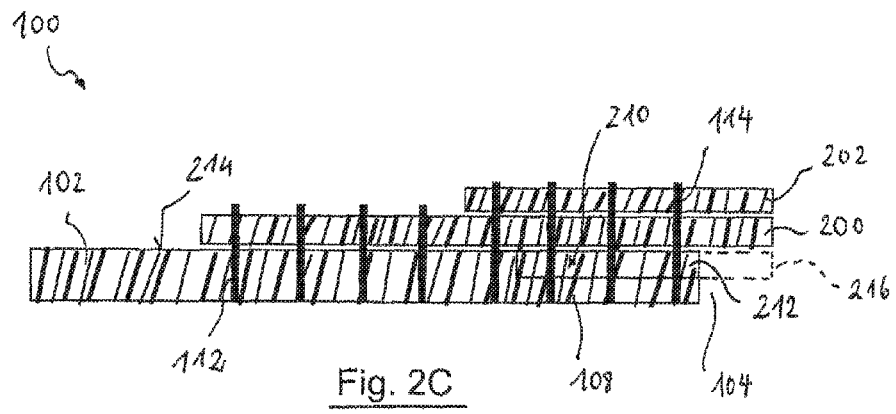
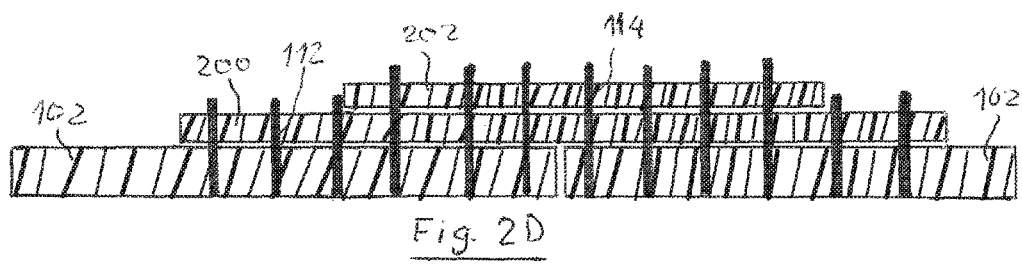
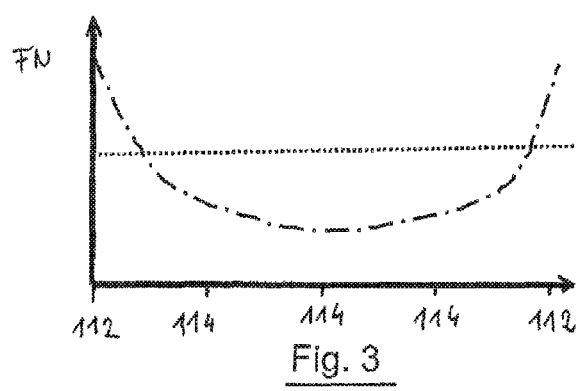

METHOD FOR PRODUCING A CONNECTOR, CONNECTOR AND AIRCRAFT OR SPACECRAFT

CROSS-REFERENCES TO RELATED APPLICATIONS

This application claims the benefit of the U.S. Provisional Application No. 61/446,563, filed on Feb. 25, 2011, and of the German patent application No. 10 2011 004 775.1 filed on Feb. 25, 2011, the entire disclosures of which are incorporated herein by way of reference.

FIELD OF THE INVENTION

The present invention relates to a method for producing a connector, to a connector and to an aircraft or spacecraft.

BACKGROUND OF THE INVENTION

FIG. 1A is a plan view of a connector 100 after a known repair method has been completed. FIG. 1B shows a sectional view along line I-I from FIG. 1A.

The connector 100 comprises a skin portion 102 of an aircraft or spacecraft (not described in greater detail) which has a damaged region in the form of a hole 104. The skin portion 102 is for example formed from a fibre composite material in the form of carbon fibre reinforced plastics material (CFRP).

For repairing the skin portion 102, it is known to arrange a patch 106 on the skin portion 102 in such a way that the patch 106 covers the hole 104. The patch 106 is also produced from a fibre composite material, in particular CFRP.

Hereafter, the patch 106 is riveted to edge regions 108, which delimit the hole 104. Corresponding rivets are denoted in FIGS. 1A and 1B by way of reference numerals 112, 114. For the sake of clearer presentation, the number of rivets in FIGS. 1A and 1B do not match.

If a load F is applied to the connector 100 in the same direction in which the rivets 112, 114 are also arranged, in FIG. 1A from left to right, each of the outermost rivets 112 bear the maximum load, each bearing for example 40% of the load, while the inner rivets 114 only bear a fraction of the load, for example only 10% of the load. This is shown in FIG. 3 by the dash-dotted line. The rivets from FIG. 1A are shown on the x-axis. The loads FN to be carried by each of these rivets are shown on the y-axis. This is a purely qualitative approach to illustrating the present problem.

The outer rivets 112 bear a comparatively high load FN, and, depending on the composition of the skin portion 102, this means that the skin portion 102 cannot easily be repaired using this method known from the prior art, since this would lead to the rivet 112 being pulled out of the corresponding point in the skin portion 102. However, even if the skin portion 102 is formed in a suitably stable manner, the method known from the prior art still poses the problem that the patch 106 has to be provided in a correspondingly stable manner in order for the load FN to be able to be borne at the point of the outer rivet 112. However, this brings about weight disadvantages.

Further, DE 10 2009 001 075 A1 discloses a repair method known from the prior art.

SUMMARY OF THE INVENTION

One idea of the present invention is therefore to provide a method for producing a connector, in particular for repair, which at least reduces the above-described disadvantages.

The following is provided according to the invention:

A method for producing a connector, in particular for repair, in particular in the field of aviation or aerospace, comprising the steps of: providing a base layer; attaching a first layer of fibre composite material having a first rigidity to the base layer; attaching a second layer of fibre composite material having a second rigidity to the first layer, offset therefrom, the second rigidity being greater than the first rigidity; and riveting the first layer to the base layer and riveting the second layer to the first layer and to the base layer.

Furthermore, a connector is provided, in particular for an aircraft or spacecraft, comprising: a base layer; a first layer of fibre composite material having a first rigidity which is attached to the base layer; a second layer of fibre composite material having a second rigidity which is attached to the first layer, offset therefrom, the second rigidity being greater than the first rigidity; and a plurality of rivets which connect the first layer to the base layer and the second layer to the first layer and the base layer.

Furthermore, an aircraft or spacecraft comprising the connector according to the invention is provided.

The invention is based on the finding that load can be uniformly distributed between the rivets in that a base layer to be connected (in particular to be repaired) is riveted to a first layer of fibre composite material and to a second layer of fibre composite material arranged on the first layer, the first and the second layer being arranged mutually offset and the second layer having a higher rigidity than the first layer.

If this approach is used, for example, in the repair method described in the introduction, a patch, which comprises the first and the second layer, is riveted to the skin portion. Since the load is more uniformly distributed between the rivets, thinner skin portions can be repaired and patches with a lower stability and thus a lower weight can be used.

Advantageous configurations of the invention are provided in the dependent claims.

In particular it should be noted that the method according to the invention can be used not only for repair, but also for connecting two base layers, for example two stringers.

In the present document, "rigidity" always relates to the modulus of elasticity of each layer and is measured in particular in Pascal.

According to a configuration of the method according to the invention, the first rigidity is between 25% and 75%, preferably between 45% and 55%, of the second rigidity. In this way, load is distributed particularly uniformly between the rivets.

According to a further configuration of the method according to the invention, the rigidity of the base layer is between 80% and 120%, preferably between 95% and 105%, of the second rigidity. In this way, load can be distributed still more uniformly between the rivets.

According to a further configuration of the method according to the invention, the first and the second layer are each provided as patches and are connected to an edge region of the base layer, which edge region encompasses a damaged region, in particular a hole or a crack. The method is thus easily configured as a repair method.

According to a further configuration of the method according to the invention, the first and the second layer are each provided as connectors and are each connected to the base layer at one portion thereof, and to a further base layer at a distance from the base layer at another portion thereof. The method is thus easily configured as a method for interconnecting two base layers, for example two stringers.

According to a further configuration of the method according to the invention, the base layer and/or the further base layer is formed as a skin, a stringer or a former. These structural components can be advantageously interconnected.

According to a further configuration of the method according to the invention, the base layer is formed from fibre composite material and/or the fibre composite material of the base layer, further base layer, first and/or second layer is selected from the group comprising: glass fibre plastics material, carbon fibre reinforced plastics material or glass fibre metal laminate. The glass fibre metal laminate is formed, for example, as a laminate, which comprises alternating layers of glass-fibre material and aluminium material (also referred to as GLARE®).

According to a further configuration of the method according to the invention, the first rigidity, the second rigidity and the rigidity of the base layer each correspond to the same predetermined loading direction. This is of particular significance for anisotropic fibre composite materials.

BRIEF DESCRIPTION OF THE DRAWINGS

The invention is described in greater detail in the following by way of embodiments, with reference to the appended drawings, in which:

FIG. 2C is a variation on the embodiment according to FIG. 2B;

FIG. 2D is a variation on the embodiment according to FIG. 2C; and

FIG. 3 is a diagram which shows a load to be borne by each rivet.

In the figures, like reference numerals denote like or functionally equivalent components, unless stated otherwise.

DETAILED DESCRIPTION OF THE PREFERRED EMBODIMENTS

Figure 1A:
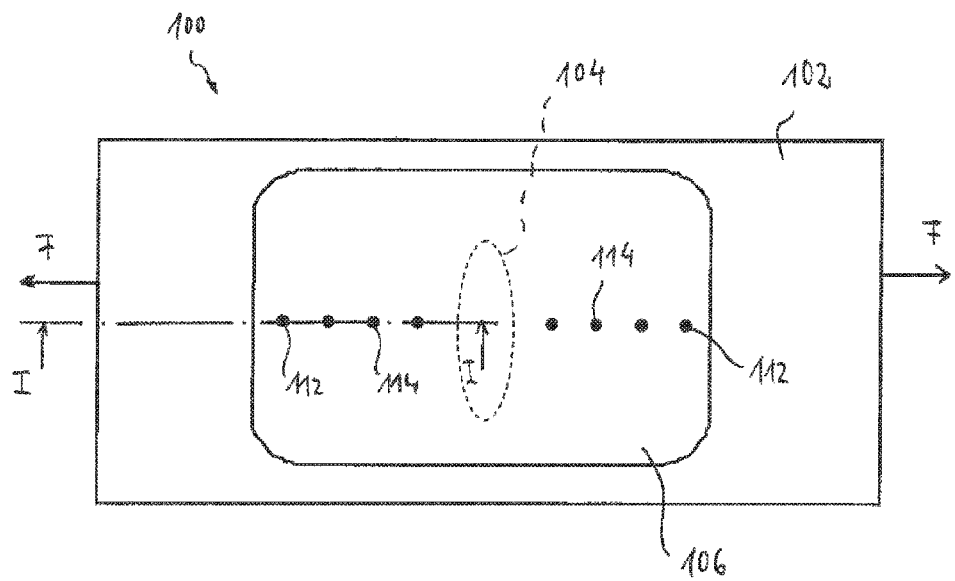
FIG. 1A is a top view of a connector known from the prior art.
Figure 1B:
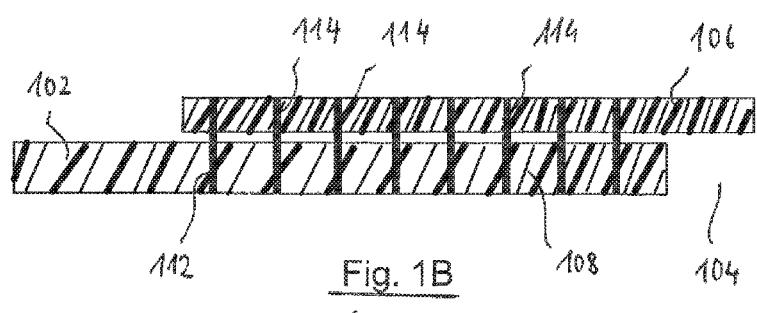
FIG. 1B is a sectional view along line I-I from FIG. 1A.
Figure 2A:
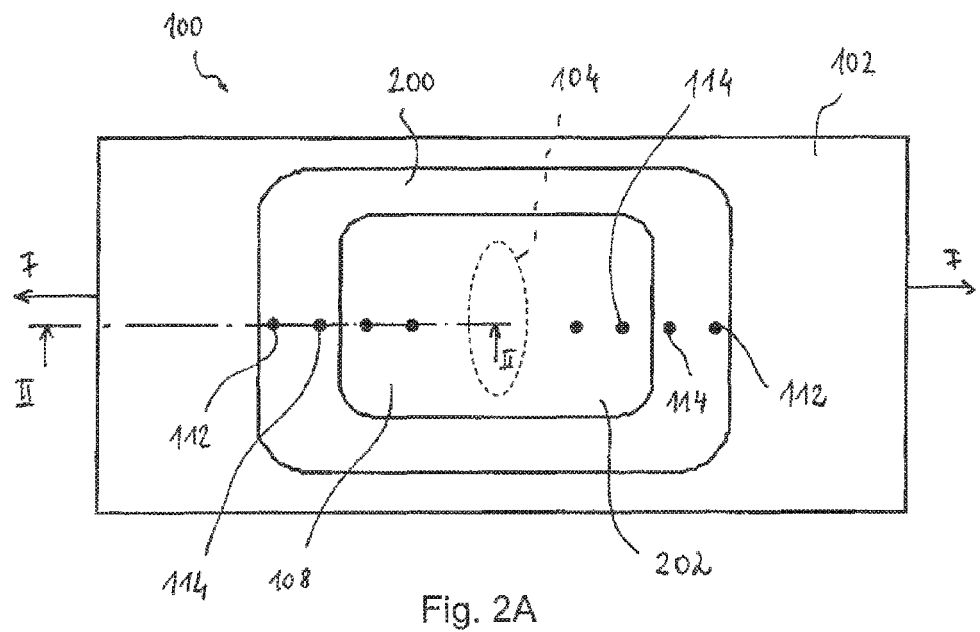
FIG. 2A is a plan view of a connector according to an embodiment of the present invention.
Figure 2B:
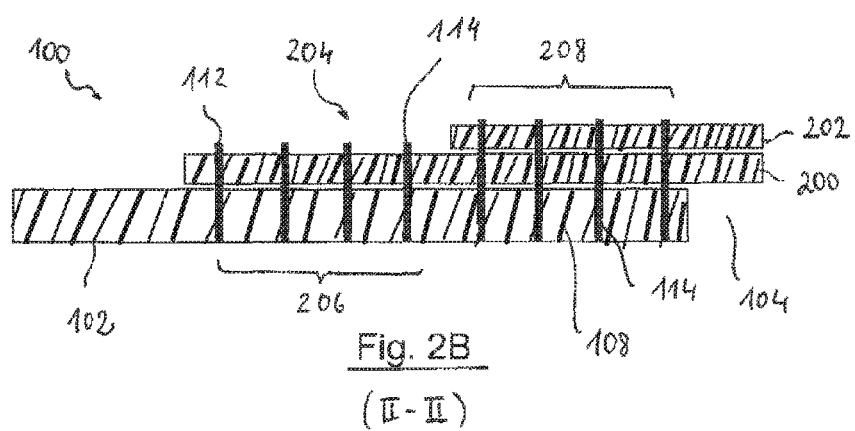
FIG. 2B is a sectional view along line II-II from FIG. 2A.

A connector 100 according to an embodiment of the present invention is shown in FIG. 2A in a plan view and in FIG. 2B in a sectional view along line II-II from FIG. 2A.

The connector 100 comprises a skin portion 102 which comprises a damaged region 104 in the form of a hole. The skin portion 102 is formed for example from CFRP. The skin portion 102 is for example a component of an aircraft which has been damaged in operation, leading to the damaged region 104.

In order to repair the damaged region 104, two patches 200, 202, formed for example from CFRP, are applied over the damaged region 104. In this case, the patch 202 is smaller than the patch 200 (in relation to the main extension plane thereof) so as to provide a step-like arrangement of the patches seen in the cross-sectional view in FIG. 2B. The corresponding step is denoted in FIG. 2B by way of the reference numeral 204.

The patches 200, 202 are preferably applied to the skin portion 102 in a cured state. In this case, the patches 200, 202 have a contour which corresponds to the contour of the skin portion 102 in order to ensure that said patches are applied without gaps. Optionally, another sealant is inserted between the patch 200 and the skin portion 102 in order to ensure pressure-tight sealing of the damaged region 104.

The patch 200 lies directly on an edge region 108 encompassing the damaged region 104. The edge region 108 is also covered by the patch 202, i.e. the patch 202 is arranged above the edge region 108 with the patch 200 in between.

The first patch 200 has for example a modulus of elasticity of approximately 40 gigapascals (in the present document also referred to as the first rigidity). The second patch 202 has a modulus of elasticity of, for example, approximately 80 gigapascals (in the present document also referred to as the second rigidity). The skin portion 102 has a modulus of elasticity of, for example, approximately 73 gigapascals (in the present document also referred to as the rigidity of the base layer).

The respective rigidities arise from the composition of each fibre composite material used. The rigidity is influenced in particular by the chemical composition of the matrix used, and the strength of the fibres used and the orientation thereof. In the present document, the rigidities relate to the direction of loading F and match the extension direction of a respective row of rivets 112, 114.

The patches 200, 202 are riveted to the skin portion 102 by the rivets 112, 114. In this case, one or more rivets 206 connect only the patch 200 to the skin portion 102 and one or more further rivets 208 connect both patches 200, 202 to the skin portion 102.

If the connector 100 is now loaded, the pattern of loading FN, shown in FIG. 3 by the dotted line, for a respective rivet 112, 114 occurs along the row of rivets shown in FIG. 2A. It can be seen that the outer rivets 112 bear a substantially equal load to the inner rivets 114.

The rivets 112, 114 can for example be titanium rivets.

FIG. 2C is a variation on the embodiment according to FIG. 2B.

In the embodiment according to FIG. 2C, the skin portion 102 is formed in the region 108 comprising a step 210. A layer 212 is inserted into the step 210. The layer 212 fits flush with the surface 214 of the skin portion 102 facing the patches 200, 202. The layer 212 can in turn be formed from a material, in particular a fibre composite material, which has a rigidity which differs from the rigidity of the skin portion 102. Using these measures, the load between the rivets 112, 114 can also be distributed still more uniformly. One or more rivets 112, 114, in particular an inner rivet 114, preferably penetrate the layer 212.

The layer 212 can also comprise a portion 216, shown in FIG. 2C by a dashed line. The portion 216 extends across the damaged region 104. In this case, the step 210 is preferably formed circumferentially to the damaged region 104, the layer 212 being inserted into this damaged region.

According to an embodiment shown in FIG. 2D, the first and the second layer 200, 202 can be used to interconnect two base layers 102 instead of covering the damaged region 104.

Although the present invention has been described by way of preferred embodiments, it is in no way limited thereto, but can be modified in various ways. In particular, it should be noted that the configurations and embodiments described in the present document for the method according to the invention can be correspondingly applied to the connector according to the invention and the aircraft or spacecraft according to the invention, and vice versa. Further, it should be noted that "a" or "one" does not exclude a plurality in the present document.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for producing a connector, comprising the steps of:
   providing a base layer formed as one of a skin, a stringer and a former of an aircraft or spacecraft;
   superimposing and attaching thereto a first layer of fibre composite material having a first modulus of elasticity on a surface of the base layer;
   superimposing and attaching thereto a second layer of fibre composite material having a second modulus of elasticity on a surface of the first layer opposite the base layer, the second layer covering only a part of the first layer such that a periphery of the second layer is inwardly offset from a periphery of the first layer, wherein the second layer is concentrically arranged on the first layer, the second modulus of elasticity being greater than the first modulus of elasticity;
   wherein the first layer and the second layer have a substantially equal thickness, and wherein a chemical composition of a composite material matrix, a strength of the fibres and an orientation thereof differs in the first layer and the second layer such that respective rigidities of the first layer and the second layer differ from each other; and
   riveting the first layer to the base layer by means of a first set of rivets at a surface portion of the first layer not covered by the second layer and riveting the second layer to the first layer and to the base layer by means of a second set of rivets at a surface portion of the first layer covered by the second layer, wherein the first and second layers are each provided as patches and connected to a region of the base layer encompassing a damaged region, or are each provided as connectors and connected to the base layer at an edge region thereof and to a further base layer at a respective edge region thereof.

2. The method according to claim 1, wherein the first modulus of elasticity is between 25% and 75% of the second modulus of elasticity.

3. The method according to claim 1, wherein the first modulus of elasticity is between 45% and 55% of the second modulus of elasticity.

4. The method according to claim 1, wherein the modulus of elasticity of the base layer is between 80% and 120% of the second modulus of elasticity.

5. The method according to claim 1, wherein the modulus of elasticity of the base layer is between 95% and 105% of the second modulus of elasticity.

6. The method according to claim 1, wherein the base layer is formed from fibre composite material and the fibre composite material of at least one of the base layer, a further base layer, the first layer and the second layer is selected from the group comprising: glass fibre plastics material, carbon fibre reinforced plastics material and glass fibre metal laminate.

7. The method according to claim 1, wherein the first modulus of elasticity, the second modulus of elasticity and a modulus of elasticity of the base layer each correspond to a same predetermined loading direction.

8. A connector for an aircraft or spacecraft, comprising:
   a base layer formed as one of a skin, a stringer and a former of an aircraft or spacecraft;
   a first layer of fibre composite material having a first modulus of elasticity being superimposed on and attached to a surface of the base layer;
   a second layer of fibre composite material having a second modulus of elasticity being superimposed on and attached to a surface of the first layer opposite the base layer, wherein the second layer is concentrically arranged on the first layer, the second layer covering only part of the first layer such that a periphery of the second layer is inwardly offset from a periphery of the first layer, the second modulus of elasticity being greater than the first modulus of elasticity;
   wherein the first layer and the second layer have a substantially equal thickness, and wherein a chemical composition of a composite material matrix, a strength of the fibres and an orientation thereof differs in the first layer and the second layer such that respective rigidities of the first layer and the second layer differ from each other; and
   a first set of rivets connecting the first layer to the base layer, wherein the first set of rivets is arranged at a surface portion of the first layer not covered by the second layer, and a second set of rivets connecting the second layer to the first layer and the base layer, wherein the second set of rivets is arranged at a surface portion of the first layer covered by the second layer, wherein the first and second layers are each provided as patches and connected to a region of the base layer encompassing a damaged region, or are each provided as connectors and connected to the base layer at an edge region thereof and to a further base layer at a respective edge region thereof.

* * * * *